Nov. 18, 1958

R. A. HENLE 2,861,199

LATCH CIRCUITS

Filed Dec. 31, 1953

INVENTOR.
ROBERT A. HENLE
BY P. E. Henninger
ATTORNEY

United States Patent Office 2,861,199
Patented Nov. 18, 1958

2,861,199

LATCH CIRCUITS

Robert A. Henle, Hyde Park, N. Y., assignor to International Business Machines Corporation, New York, N. Y., a corporation of New York Application December 31, 1953, Serial No. 401,638

1 Claim. (Cl. 307—88.5)

This invention relates to latch circuits, especially to latch circuits including transistors.

A bistable circuit is a circuit having two stable output states, which states are distinguished by substantially separated current and potential values. A latch circuit may be defined as a bistable circuit having two sets of input terminals and one set of output terminals, wherein a signal is applied to one set of input terminals to cause the circuit to transfer from one of its output states to the other, and a signal is applied to the other set of input terminals to cause the circuit to transfer back to its original output state. In any bistable circuit, there is a positive feedback from the output back to the input, which causes the output to remain stable after the input signal which initiated the state of the output circuit is discontinued.

Attempts have been made to provide bistable latch circuits employing single transistors. The specific circuits which have been suggested previously have not given satisfactory operation because of instability and also because of changes in the characteristics of transistors with time. Furthermore, because of the differences in the characteristics of individual transistors, it has not been possible to construct such a circuit without careful selection of the transistor and careful adjustment of the impedance values.

There is shown and described in U. S. Patent No. 2,609,428, issued to Harold B Law, on September 2, 1952, a transistor having an asymmetrically conductive base electrode instead of the more conventional ohmic base electrode. The type of transistor described by Law is characterized by a current gain which is much higher than that of conventional transistors. Because of this high current gain, variations in the transistor characteristics are apt to be less important than in conventional transistors.

An object of the present invention is to provide an improved latch circuit including a single transistor.

A further object is to provide an improved latch circuit including a single transistor of the type described in the Law patent mentioned above.

Another object is to provide a novel feedback network and input network for a latch circuit.

The foregoing and other objects of the invention are attained in the circuit described herein by connecting a transistor of the Law type with a novel feedback and input network. This network includes a conventional biasing branch connected between the base and emitter electrodes and including a battery and a resistor in series; a set signal branch connected between the base and emitter electrodes and including in series a set signal generator, first and second oppositely poled, asymmetrically conductive impedance elements, the first of said elements being poled oppositely to the potential of the signal generator, and a resistor; a reset signal branch connected between the base electrode and the emitter electrode and including in series reset signal generating means, an asymmetrically conductive impedance element poled with the same polarity as the signal generator, and the resistor of said set signal branch; and a feedback signal branch connected between the collector and the common junction between the two oppositely poled asymmetrically conductive impedance units in the set signal branch, said feedback signal branch comprising an asymmetric impedance element poled in the same sense with respect to said common junction as the two oppositely poled elements.

Other objects and advantages of the invention will become apparent from a consideration of the following specification and claim, taken together with the accompanying drawing.

Figure 1:
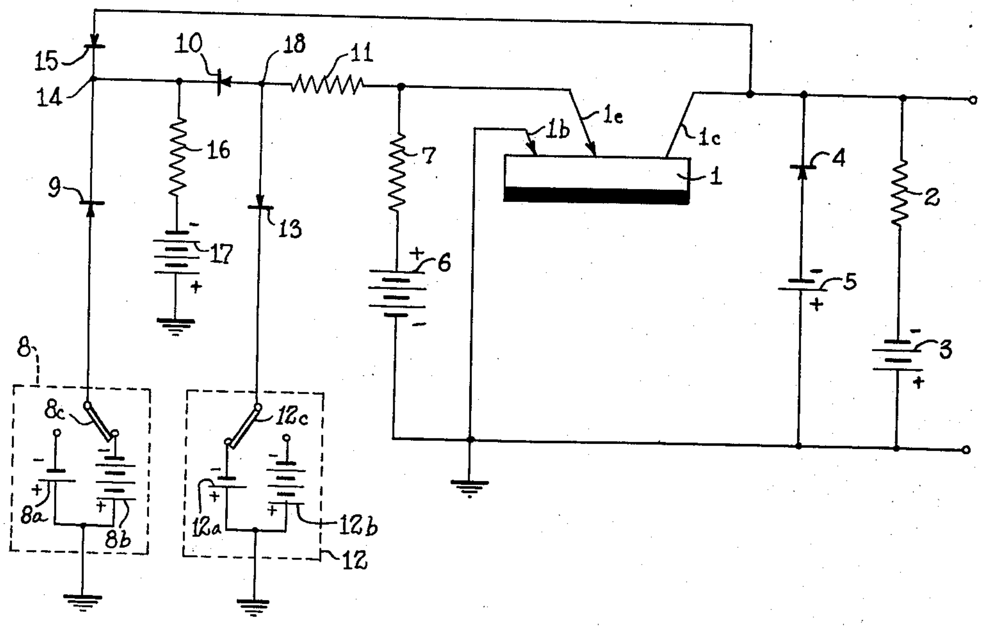
Fig. 1 is a wiring diagram of an electric circuit embodying the invention.

There is shown in the drawing a transistor 1 having an emitter electrode 1*e*, a collector electrode 1*c*, and an asymmetrically conductive base electrode 1*b*. The base electrode 1*b* is connected directly to ground. Collector electrode 1*c* is connected to ground through a conventional load resistor 2 and a battery 3. In parallel with the load branch is connected another branch circuit including an asymmetric impedance element 4 and a battery 5. This branch circuit is provided to limit the "fall" time of the transistor by clamping the collector at a voltage less negative than that which it would return to were it not for the diode.

The emitter 1*e* is connected to the grounded base electrode 1*b* through a network having several branches, including a conventional biasing branch which comprises a battery 6 and a resistor 7 connected in series. A set signal branch connected between ground and the emitter 1*e* comprises in series a set signal generator 8, two oppositely poled asymmetric impedance elements 9 and 10, and a resistor 11. A reset signal branch is connected between ground and emitter 1*e* and includes a reset signal generator 12, an asymmetric impedance element 13 and the resistor 11. A feedback signal branch is connected between collector 1*c* and the common junction 14 between impedance elements 9 and 10, and comprises a single asymmetric impedance element 15. Junction 14 is connected to ground through a resistor 16 and a biasing battery 17.

The signal generators 8 and 12 may comprise any suitable signal generating mechanism having current and potential characteristics which will cause the circuit to operate properly. The signal generator 8 is shown, by way of example, as comprising a low potential battery 8*a*, a high potential battery 8*b* and a single-pole, double-throw switch 8*c* operable selectively to connect one or the other of the batteries 8*a* and 8*b* in series in the set signal branch. The reset signal generator 12 is similarly illustrated by way of example as including a low potential battery 12*a*, a high-potential battery 12*b* and a switch 12*c*. The normal condition of the generator 8 is with the switch 8*c* in position to transmit the high potential through the set signal input. The normal condition of the reset signal generator 12, on the other hand, is with the switch 12*c* in position to connect the low potential battery 12*a* in series with the reset signal input. Both switches 8*c* and 12*c* are shown in their normal positions in the drawing.

As pointed out in the Law Patent No. 2,609,428, mentioned above, a transistor of this type has interchangeable base and emitter electrodes. Consequently, either of the electrodes 1*b* and 1*e* may be considered the base electrode and the other the emitter electrode. For purposes of clarity, however, each of these two electrodes has been assigned a specific name herein.

Figure 2:
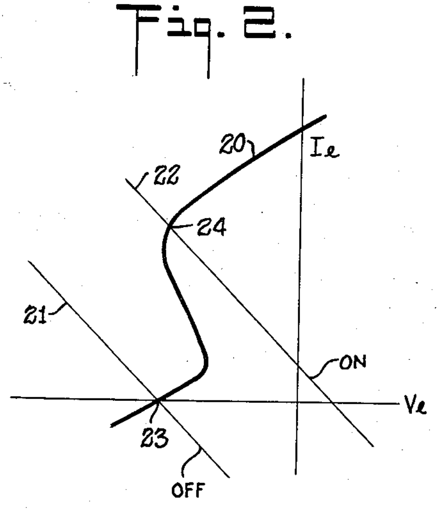
Fig. 2 is a graphical illustration of certain characteristics of the transistor in the circuit of Fig. 1.

Fig. 2 shows an input characteristic of a transistor of the type illustrated. The characteristic is shown by the curve 20, which represents the variation of emitter current with emitter potential. Two load lines 21 and 22 are also shown in Fig. 2, 21 representing the "off" load line and 22 representing the "on" load line. The shift of operation from one load line to the other is accomplished in the manner described in detail below. In the "off" condition, the circuit operates at point 23, with zero emitter current and a negative emitter voltage. In the "on" condition, the circuit operates at point 24, with an emitter potential only slightly more positive than the "off" potential, but with a substantially greater emitter current.

*Operation*

When the transistor is in its "off" or low current output state, both the switches 8*c* and 12*c* are in the positions illustrated, the collector 1*c* is at a potential substantially equal to that of the negative terminal of battery 5, and the emitter 1*e* is at a potential determined by two parallel voltage divider actions, one between the positive terminal of battery 6 and the negative terminal of battery 12*a* through the resistors 7 and 11 and the impedance element 13 in its high impedance direction, and the other through resistors 7 and 11 and elements 10 and 9 to battery 8*b*. The impedances of the resistors 7 and 11 are so chosen that the potential of emitter 1*e* at this time is slightly negative with respect to the base, so that the transistor 1 remains "off."

When it is desired to turn the circuit on, the signal generator 8 is operated, as by moving the switch 8*c* to drop the applied negative potential from that of battery 8*b* to that of battery 8*a*. As a result, the entire set signal input branch including impedance elements 9 and 10 and resistor 11 becomes less negative than before, impedances of the various elements being so chosen that the emitter 1*e* becomes slightly more positive, and the transistor turns on, conducting a substantial collector current. The potential of collector 1*c* is thereby changed substantially in the positive direction, due to the potential drop across load resistor 2. This change in the collector potential is transmitted through impedance element 15 to the input circuit. Once the stable high output condition is reached, the subsequent restoration of switch 8*c* to its normal position does not affect the output state since the potential of emitter 1*e* is held positive by the feedback action through impedance element 15.

After the transistor has been established in its high output or "on" state, it may be returned to its low output state by operating the reset signal generator 12. In the structural example of that generator which is illustrated, this is accomplished by moving switch 12*c* to its right-hand position so that the negative potential of the high potential battery 12*b* is applied to the input circuit. This signal is effective to swing the emitter 1*e* negative, thereby causing the transistor 1 to cut off. The resulting change in potential of collector 1*c* is transmitted through impedance element 15 to the input network, so that the subsequent change of switch 12*c* back to its normal position does not have the effect of restoring the transistor 1 to its "on" condition.

The operation of the circuit may be alternatively described in terms of an Or circuit cascaded with an And circuit to control the current and potential of the emitter 1*e*. Considering the circuit from this standpoint, the Or circuit comprises the diodes 9 and 15, resistor 16 and battery 17. In this circuit, junction 14 swings from negative toward positive values, and is made positive when either diode 9 or diode 15 becomes substantially conductive. Diode 9 may be turned "on," i. e., made conductive, by operating switch 8*c* in signal generator 8 to its "on" position, thereby reducing the voltage opposing battery 17 in a loop circuit which may be traced from the positive terminal of battery 17 through ground, signal generator 8, diode 9 and resistor 16 back to the negative terminal of battery 17. Junction 14 is likewise changed in a positive sense whenever the collector 1*c* becomes positive as the transistor 1 is turned on, the current flow being then from collector 1*c* through diode 15 and resistor 16 to the negative terminal of battery 17.

The diodes 10 and 13 and resistor 11 comprise an And circuit. The junction 18 in this circuit swings from negative toward a positive value, and reaches its positive value only when both the junction 14 and the reset signal generator 12 are in their positive conditions. If one or the other of these two points, i. e., junction 14 and reset signal generator 12, is negative, then either diode 10 or diode 13 conducts and a potential drop takes place across resistor 11 to hold junction 18 negative. However, when both junction 14 and reset signal generator 12 are positive, then the current flow through resistor 11 is substantially reduced, and junction 18 and emitter 1*e* are both swung positive. Reset signal generator 12 is normally in its more positive condition, as illustrated in the drawing. The shifting of junction 14 between its negative and positive conditions has been described above.

The following table shows, by way of example, a particular set of values for the potentials of the various batteries and for the impedances of the various resistors, in a circuit which has been operated successfully. It will be understood that these values are set forth by way of example only and that the invention is not limited to these values or any of them. No values are given for the asymmetric impedance elements, which may be considered to have substantially zero impedance in their forward direction and substantially infinite impedance in their reverse direction.

*Table I*

| | | |
|---|---|---|
| Resistor 2 | ohms | 7500 |
| Battery 3 | volts | 90 |
| Battery 5 | do | 15 |
| Battery 6 | do | 90 |
| Resistor 7 | ohms | 43,000 |
| Battery 8*a* | volts | 4.5 |
| Battery 8*b* | do | 15.5 |
| Resistor 11 | ohms | 5600 |
| Battery 12*a* | volts | 4.5 |
| Battery 12*b* | do | 15.5 |
| Resistor 16 | ohms | 30,000 |
| Battery 17 | volts | 90 |

While I have shown and described a preferred embodiment of my invention, other modifications thereof will readily occur to those skilled in the art and I therefore intend my invention to be limited only by the appended claim.

I claim:

A latch circuit comprising a single transistor including a semi-conductive body, a collector electrode and two additional electrodes, all in asymmetrically conductive electrical contact with said body, means directly conductively connecting one of said additional electrodes to a common junction, a load resistor and a first source of unidirectional electrical energy connected in series between said collector electrode and said junction, said source being poled to apply reverse bias between said collector electrode and said one additional electrode, a second resistor and a second source of unidirectional electrical energy connected in series between said additional electrodes, said second source being poled to apply forward bias between said additional electrodes, a first signal source shiftable between separated "on" and "off" potential values, a first diode and a third resistor connected in series between one terminal of said first signal source and the other of said additional electrodes, means connecting the other terminal of said first signal source to said common junction, a second signal source shiftable between separated "on" and "off" potential values, second and third oppositely poled diodes connected in series between one terminal of said second source and the junction between said first diode and said third resistor, and means connecting the opposite terminal of said second signal source to said common junction, each said signal source cooperating with said second and third resistors to tend to shift the potential of said other additional electrode with respect to said common junction between "on" and "off" values corresponding to the "on" and "off" potential values of the sources, said transistor being effective when said other additional electrode is at its "on" and "off" values to produce corresponding "on" and "off" stable output conditions at the collector electrode, a fourth diode, said fourth diode only being direct current conductively connected between said collector electrode and the common junction of said second and third diodes, said fourth diode cooperating with said second and third resistors to transmit to said other additional electrode "on" and "off" direct potential values corresponding to the "on" and "off" output conditions at the collector electrode, and being effective when the circuit is in its "on" output condition to maintain said circuit stably in said "on" output conditions until both said signal sources are simultaneously shifted to their "off" potential values.

References Cited in the file of this patent

UNITED STATES PATENTS

| | | |
|---|---|---|
| 2,533,001 | Eberhard | Dec. 5, 1950 |
| 2,609,428 | Law | Sept. 2, 1952 |
| 2,644,893 | Gehman | July 7, 1953 |
| 2,644,896 | Lo | July 7, 1953 |
| 2,644,897 | Lo | July 7, 1953 |
| 2,760,087 | Felker | Aug. 21, 1956 |